(12) United States Patent
Brown

(10) Patent No.: US 7,540,668 B2
(45) Date of Patent: Jun. 2, 2009

(54) FIBER OPTIC CONNECTOR FOR COUPLING LASER ENERGY INTO SMALL CORE FIBERS, AND TERMINATION METHOD THEREFOR

(76) Inventor: Joe D. Brown, 8317 Front Beach Rd., Suite 21, Panama City Beach, FL (US) 32407

( * ) Notice: Subject to any disclaimer, the term of this patent is extended or adjusted under 35 U.S.C. 154(b) by 0 days.

(21) Appl. No.: 12/003,249

(22) Filed: Dec. 21, 2007

(65) Prior Publication Data
US 2008/0175539 A1   Jul. 24, 2008

Related U.S. Application Data

(60) Provisional application No. 60/876,521, filed on Dec. 22, 2006, provisional application No. 60/960,568, filed on Oct. 4, 2007, provisional application No. 60/961,000, filed on Oct. 24, 2007.

(51) Int. Cl.
   *G02B 6/36* (2006.01)
   *G02B 6/38* (2006.01)

(52) U.S. Cl. ............................. 385/78; 385/60; 385/72; 385/79

(58) Field of Classification Search ................ 385/60, 385/72, 78, 79, 85
See application file for complete search history.

(56) References Cited

U.S. PATENT DOCUMENTS

| | | |
|---|---|---|
| 3,912,362 A | 10/1975 | Hudson |
| 4,060,308 A | 11/1977 | Barnoski et al. |
| 4,474,429 A | 10/1984 | Yoldas et al. |
| 4,575,181 A | 3/1986 | Ishikawa |
| 4,678,273 A | 7/1987 | Vilhelmsson |
| 4,737,011 A | 4/1988 | Iri et al. |
| 4,762,385 A | 8/1988 | Fuse |
| 4,784,466 A | 11/1988 | Khoe et al. |
| 4,883,342 A | 11/1989 | Ishii et al. |
| 5,101,457 A | 3/1992 | Blonder et al. |
| 5,132,079 A | 7/1992 | Stewart et al. |
| 5,179,610 A | 1/1993 | Milburn et al. |
| 5,243,681 A | 9/1993 | Bowen et al. |
| 5,274,721 A | 12/1993 | Dickinson et al. |
| 5,291,570 A | 3/1994 | Filgas et al. |
| 5,299,141 A | 3/1994 | Hungerford et al. |
| 5,490,227 A | 2/1996 | Tanabe et al. |
| 5,619,602 A | 4/1997 | Sandrstom et al. |
| 5,829,445 A | 11/1998 | Martin et al. |

(Continued)

FOREIGN PATENT DOCUMENTS

JP            11142684    *   5/1999

*Primary Examiner*—Charlie Peng
(74) *Attorney, Agent, or Firm*—Bacon & Thomas, PLLC

(57) ABSTRACT

A transparent ferrule is fused to an end of an optical fiber to increase the coupling area without altering the input numerical aperture of the fiber system. This is accomplished by controlling the length of the area at which the transparent ferrule is fused or welded. In addition, an extended ferrule portion is situated behind the fusion area and is separated from the fiber core such that light that fails to couple to the core is reflected from the inner diameter of the extended ferrule portion away from the fiber core, where it can be deflected or dissipated by a beam block or absorptive material. The transparent ferrule is formed from a plurality of relative thin wall ferrules that are successively fused from the side to form at the least the termination or coupling end of the transparent ferrule.

13 Claims, 7 Drawing Sheets

U.S. PATENT DOCUMENTS

| | | |
|---|---|---|
| 5,946,437 A | 8/1999 | Uchida et al. |
| 6,154,596 A | 11/2000 | Sandrstrom et al. |
| 6,282,349 B1 | 8/2001 | Griffin |
| 6,398,777 B1 | 6/2002 | Navarro et al. |
| 7,204,645 B2 | 4/2007 | Brown |
| 2004/0092913 A1 | 5/2004 | Hennings |
| 2007/0172174 A1* | 7/2007 | Scerbak et al. ............ 385/76 |

* cited by examiner

FIBER OPTIC CONNECTOR FOR COUPLING LASER ENERGY INTO SMALL CORE FIBERS, AND TERMINATION METHOD THEREFOR

This application claims the benefit of provisional application Nos. 60/876,521, filed Dec. 22, 2006, 60/960,568, filed Oct. 4, 2007, and 60/961,000, filed Oct. 24, 2007.

BACKGROUND OF THE INVENTION

1. Field of the Invention

This invention generally relates to coupling of radiant energy from a radiant energy source to the conducting medium of a primary optical system, and in particular to a termination arrangement or connector for coupling laser energy to an optical fiber system, and to a method of manufacturing or assembling such a termination or connector.

The invention allows for focusing a fixed spot into a smaller core fiber by utilizing refractive properties of a transparent ferrule surrounding the entrance surface of the fiber, while avoiding manufacturing and heat transfer problems associated with the fiber termination disclosed in U.S. Pat. No. 6,282,349 (Griffin).

The invention may be used in a variety of laser deliver systems including, by way of example and not limitation, medical laser applications such as the laser delivery apparatus with safety feedback disclosed in copending U.S. patent application Ser. Nos. 11/510,691 and 11/714,785, and the venous ligation methods and systems disclosed in U.S. Pat. No. 6,398,777 (Diomed) and U.S. Patent Application Publication No. 2004/0092913 (Hennings). Furthermore, by enabling coupling to smaller, more flexible fibers, the invention makes it possible in certain medical applications, to entirely eliminate the need for an introducer or catheter to guide the fiber to the treatment area.

2. Description of Related Art

In optical fiber applications where fiber size or flexibility is important, a problem often arises in that it is difficult to couple light to the fiber, either because the fiber has a core diameter smaller than the focused spot of the laser source, the focused spot is not precisely aligned with the fiber, and/or the acceptance angle is too small to accept all of the focused radiant energy. This reduces the efficiency of the delivery system, limiting the amount of energy that can be delivered, and in addition raises the possibility of damage to the fiber termination and/or connector, or of unwanted coupling of light to the cladding of the fiber, which can cause damage downstream from the termination. A discussion of the problems associated with stray light, and solutions involving various arrangements for dissipating or deflecting uncoupled light away from the fiber cladding and/or vulnerable components of the termination connector is found in copending U.S. Pat. No. 7,204,645, herein incorporated by reference.

In addition to the deflection/dissipation approach to radiation that fails to couple to the fiber core, U.S. Pat. No. 7,204,645 proposes tapering the input end of the fiber in order to increase the size of the surface through which radiation enters the fiber. However, the use of tapers has the disadvantage of enabling light to enter the fiber at increased angles of incidence, thereby creating higher order propagation modes which limit the bend performance of the fiber or alter the output.

Alternatively, it has been proposed to increase the coupling surface area by fusing a cylindrical glass ferrule to the end of the fiber, as disclosed for example in U.S. Pat. No. 6,282,349 (Griffin). As described therein, an optical fiber, which has at least a silica core and a polymer external jacket, is attached to a quartz ferrule by stripping the external jacket from a length of the end of the optical fiber to expose a portion of the silica core. The inner core of the fiber is inserted into the bore in the quartz ferrule, and is fused to the quartz ferrule by means of heat fusion, without employing any adhesives, to bond the ferrule and the optical fiber together. A metal beam block surrounds at least a portion of the quartz ferrule on the side where the optical fiber is inserted into it. The beam block includes an extension surrounding the polymer external jacket of the fiber, and the extension is crimped onto the polymer jacket to hold the beam block and fiber in place.

In the Griffin patent, heat fusion of the inner core of the fiber to the quartz ferrule is accomplished by means of laser energy, either end-on or from the side with rotation of the quartz ferrule and the included fiber core. In principle, the heat fusion should form an integral glass end on the ferrule which securely locks the fiber to the ferrule. However, it has been very difficult in practice to implement the heat fusion proposed by Griffin in practice. The reason is that the quartz ferrules are too thick (typically ~2 mm in diameter) for a $CO_2$ laser to penetrate and fuse the fiber to the quartz ferrule. In addition, by attaching a beam block to the quartz ferrule in order to prevent damage during fusion, Griffin fails to provide a way to adequately deflect or dissipate radiation that fails to couple to the core through the quartz ferrule, and therefore the Griffin arrangement still presents a risk of damage to the connector. Still further, like the tapered fiber termination, the quartz ferrule arrangement of Griffin is still subject to creation of higher order propagation modes.

SUMMARY OF THE INVENTION

It is accordingly a first objective of the invention to provide a fiber termination arrangement for coupling a laser to an optical fiber, in which the percentage of radiation that couples to the fiber is increased by increasing an area of the coupling end of the fiber.

It is a second objective of the invention to provide a fiber termination arrangement for coupling a laser to an optical fiber that increases an effective coupling area of the fiber and that also provides enhanced dissipation of radiation incident on the surface that does not couple to the fiber.

It is a third objective of the invention to provide a fiber termination arrangement for coupling a laser to an optical fiber, that not only increases the effective coupling area of the fiber but that also minimizes creation of higher order propagation modes within the fiber.

It is a fourth objective of the invention to provide an optical fiber coupling termination having a glass ferrule surrounding the end of the fiber for increased coupling efficiency but that may be more easily manufactured and/or assembled in comparison with prior terminations such as the one disclosed in U.S. Pat. No. 6,282,349 (Griffin).

It is a fifth objective of the invention to provide an optical fiber coupling termination that permits use of relatively thin fibers so as to eliminate the need, in medical applications, for an introducer or catheter to guide the opposite or distal end of the fiber to the treatment area.

These objectives are accomplished, in accordance with the principles of a preferred embodiment of the invention, by providing a fiber coupling termination including a transparent glass or quartz ferrule that is fused to the fiber, and in which the termination is positioned with a connector body and held in place solely by adhesive or mechanical means, without otherwise crimping the glass ferrule to the connector body, the connector body instead being secured to a fiber buffer at a rear of the termination. Preferably, the area of contact between the connector body and the ferrule is made as small as possible to minimize energy transfer to the connector body.

In an especially preferred embodiment of the invention, the transparent ferrule may include a refractive surface which enhances coupling of radiation to the fiber by increasing the coupling area without altering the input numerical aperture of the fiber system. This is accomplished by controlling the length of the area at which the transparent ferrule is fused or welded to the fiber core while providing for an extended ferrule length, thereby accomplishing both an increase in coupling efficiency and dissipation of errant radiation while preventing the formation of higher order modes. The fiber termination of the invention may be combined with that disclosed in U.S. Pat. No. 7,204,645 (Brown), or with other fiber termination arrangements of connectors.

In order to maintain the same numerical aperture as a bare fiber, the length of the weld or fusion area in which the fiber core is welded or fused to the transparent ferrule is controlled to have a minimum and maximum length of between $$L_{min} = y_1/\tan \phi_2, \text{ and}$$

$$L_{max} = [y_1 + \text{core diameter}]/\tan \phi_2,$$

where $Y_1 = [\text{spot size of the laser} - \text{core diameter}]/2$ and $\phi_2$ is an angle between a maximum refracted angle of the incident laser beam.

In addition, behind the fusion area is an extended ferrule portion that is separated from the fiber core such that light that fails to couple to the core is reflected from the inner diameter of the extended ferrule portion away from the fiber core, where it can be deflected or dissipated by a beam block or absorptive material.

In order to solve the practical problem of insufficient penetration of the laser used to carry out fusion of the fiber core to the transparent ferrule, the invention provides for the ferrule to be formed from a plurality of relative thin wall ferrules that are successively fused from the side to form at the least the termination or coupling end of the transparent ferrule.

The connector body in which the termination is housed to complete the coupling arrangement may take a variety of forms and still minimize the area of contact between the termination and the connector body. For example, the entrance end of the termination may be surrounded by a recess or well provided in the connector body to isolate the termination from the connector body, with the termination being held in place by a collar. Alternatively, the well may be replaced by a second transparent ferrule, and/or by additional absorption or scattering structures, including discrete members provided in the connector and/or surface treatments of the ferrule itself.

It will be appreciated that the present invention is concerned only with the input or coupling end of the fiber, and not with the output end. The invention may be used in connection with, but is not limited to, scalpels, lithotripter fibers, and venous ligation devices.

DETAILED DESCRIPTION OF THE PREFERRED EMBODIMENTS

Figure 1:
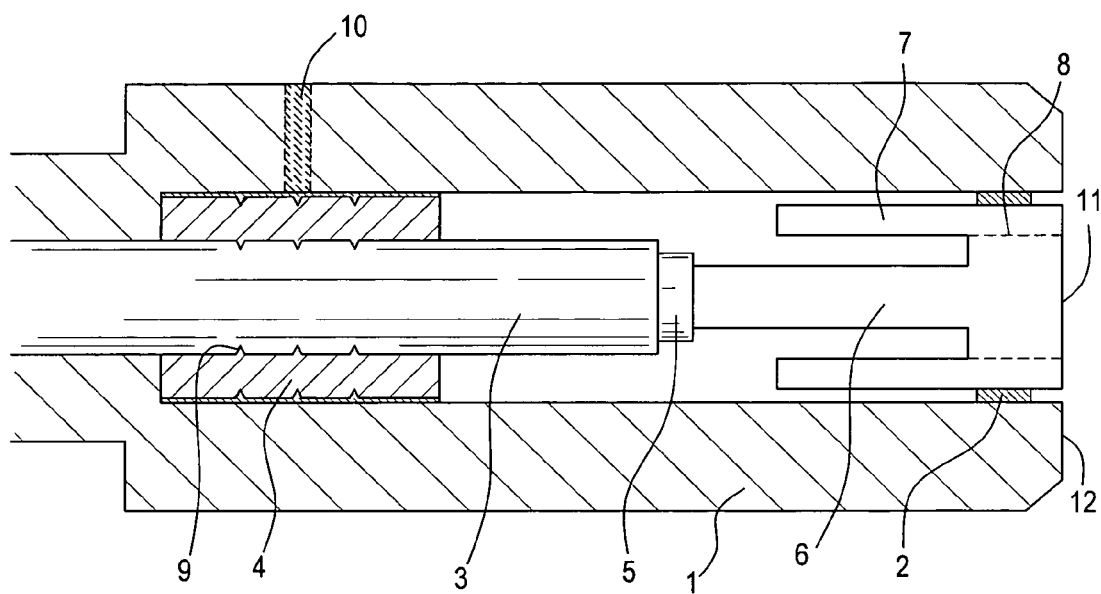
FIG. 1 is a cross-sectional view of an optical fiber coupling or input termination constructed in accordance with the principles of a preferred embodiment of the invention.

FIG. 1 illustrates a preferred embodiment of the invention including an optical fiber having a fiber core 6, a cladding layer 5, and a fiber buffer 3. The optical fiber may be made of any conventional fiber materials, including but not limited to glass or silica core materials, and glass, silica, or polymer cladding and buffer materials. A transparent ferrule 7 is fused or welded to the termination or coupling end of the fiber core in the region indicated by dashed line 8. The transparent ferrule may be made, by way of example and not limitation, of quartz or glass.

A crimp ferrule 4 is crimped onto the fiber buffer 6 at crimp region 9, but is not adhered or in contact with to the transparent ferrule 7. The crimp ferrule 4 may be used to hold the fiber during stripping of the cladding layer and welding or fusing of the transparent ferrule 7 to the fiber core 6, and as is conventional may be made of a malleable material such as metal. After completion of welding or fusing, the connector body 1 is secured to the crimp ferrule 4, for example by injecting an adhesive through an opening or hole 10 in the connector body 1 after the glass ferrule 7 has been welded or fused onto the fiber core 6. In addition, transparent ferrule may be secured to the connector body 1 by an adhesive. The connector body 1 is a conventional connector body and may be made of a variety of plastic, ceramic, or metal materials. The coupling surface 11 of the fiber core 6, through which laser light enters the core, is illustrated as being flush with the end of the connector body 1, although those skilled in the art will appreciate that flushness is not required and that the core may therefore extend beyond or be recessed within the connector body 1.

Figure 2:
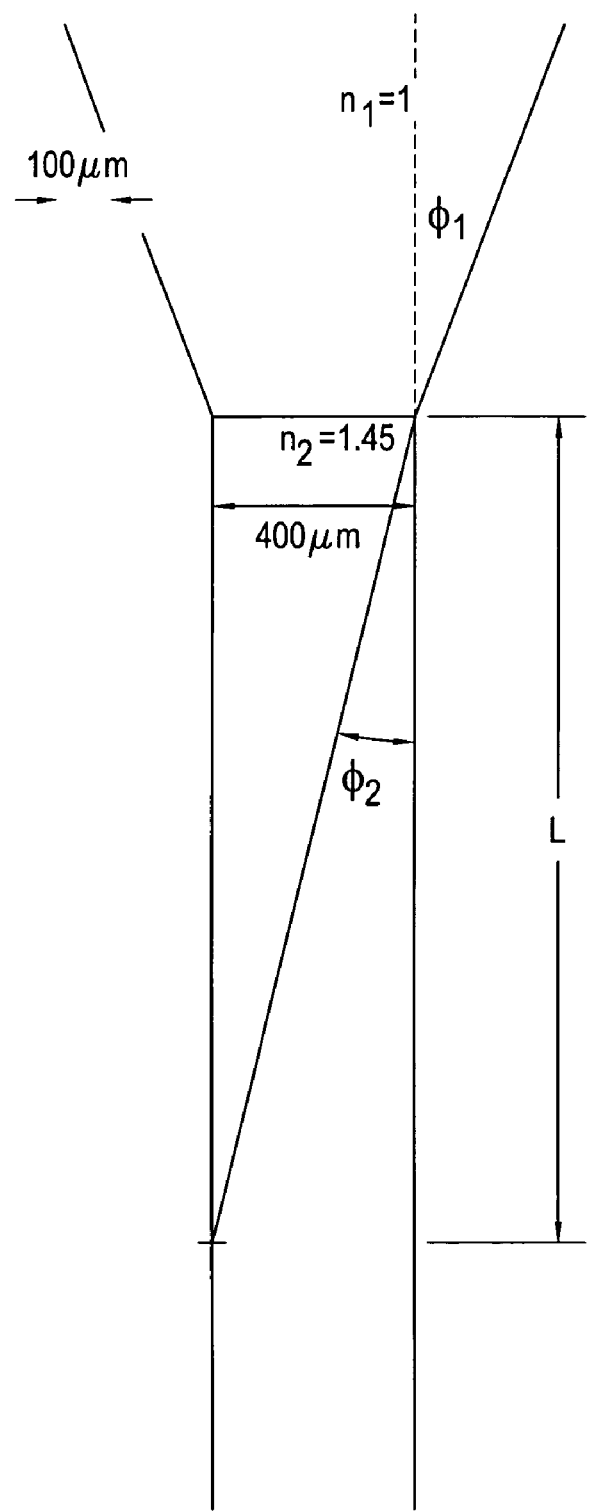
FIGS. 2 and 3 are schematic illustrations of the variables involved in determining a fusion length so as to achieve an increased coupling area without increasing the numerical aperture of the termination.
Figure 3:
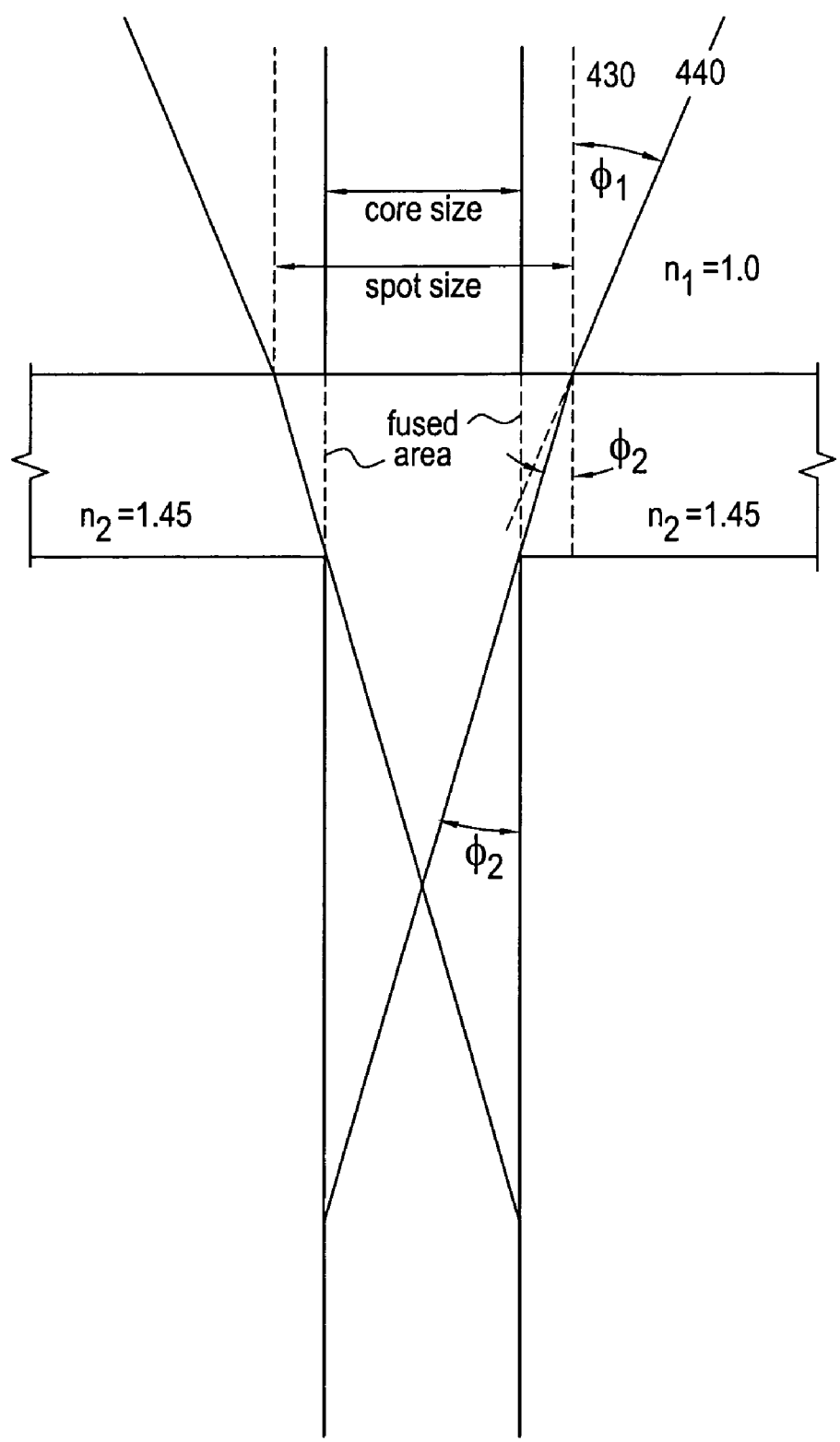
Figure 4:
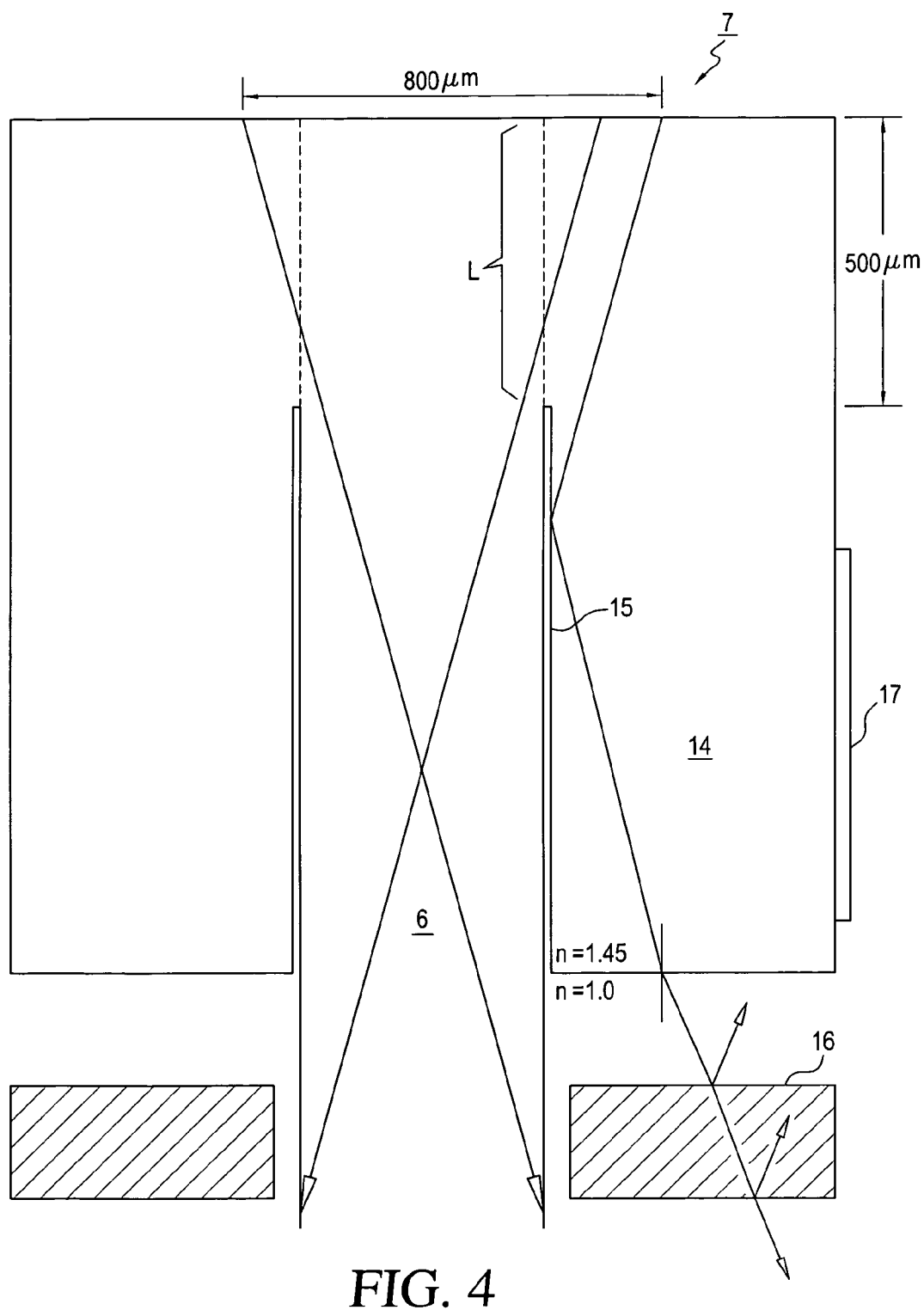
FIG. 4 is a side view of an optical fiber coupling arrangement for use in the termination of FIG. 1.

The structure and dimensions of the transparent ferrule may be understood from FIGS. 2-4. FIG. 2 illustrates the relationship between the fiber diameter, a maximum refracted coupling angle $\phi_2$, and a length L. L is the minimum length along the fiber that internal reflection of the incident beam occurs, which is necessary to ensure that light coupling with the fiber does not escape the fiber core by refracting back into the transparent ferrule. As shown in FIG. 2, for a laser numerical aperture NA of 0.35 having a beam focused on the end of the fiber, the maximum angle of incidence $\phi_1 = \sin(0.35) = \sim 21°$. If the core index of refraction $n_2$ is 1.45, Snell's Law ($n_1 \sin \phi_1 = n_2 \sin \phi_2$, where $n_1$ is the refraction index of air, namely 1) provides that $\phi_2 = \sim 14°$. Since $\tan \phi_2 = $ fiber diameter/L, if the core diameter is 0.4 mm, then L=1.6 mm.

Welding of a transparent ferrule to the fiber core enables a larger spot size to be coupled to the fiber core, as illustrated in FIG. 3. In order to prevent the formation of higher order modes, it is preferred to maintain the same effective numerical aperture as a bare fiber, i.e., to control refraction so that the maximum angle $\phi_2$ at which light enters the fiber corresponds to that of the 4 mm diameter bare fiber core shown in FIG. 2, namely 14°. In that case the fused or welded area can have a length L of between:

$$L_{min} = y_1/\tan \phi_2, \text{ and}$$

$$L_{max} = [y_1 + \text{core diameter}]/\tan \phi_2,$$

where $L_{min}$ and $L_{max}$ are respective minimum and maximum lengths and $y_1 = [\text{spot size of the laser-core diameter}]/2$.

A preferred fiber termination constructed in accordance with the principles illustrated in FIGS. 2 and 3 is shown in FIG. 4. The weld length is selected to be 0.5 mm, with the indices of refraction and fiber dimensions being the same as indicated in FIGS. 2 and 3.

Behind the fusion area L is an extended ferrule portion 14 that is separated from the fiber core 6 such that light that fails to couple to the core is reflected from the inner surface 15 of the extended ferrule portion 14 and thereby directed away from the fiber core, where it can be deflected or dissipated by a beam block or block of absorptive material 16 positioned at the end of the extended ferrule portion 14, or by a layer or sleeve of absorptive material 17 surrounding the extended ferrule portion 14. For example, if the laser NA is increased such that the spot size is 0.8 mm, then radiation outside the 0.6 mm aperture illustrated in FIG. 3 will be reflected from surface 15 to the beam block 16. The surface 15 is defined by a cylindrical space or gap 18 extending rearwardly from the fused region L to a rear of the transparent ferrule, and which may be created by enlarging, in the area to the rear of the area to be fuse, the bore in the ferrule through which the fiber core is inserted prior to welding.

In order to solve the problem that a conventional weld or fusion laser has a limited penetration depth, the ferrule shown in FIG. 4 may be formed of multiple thin wall ferrules welded or fused to each other, with the innermost ferrule 18 having an inner diameter approximately equal to that of the core 6 so that it fits over and can be welded to the core, a second ferrule 19 having an inner diameter approximately equal to the outer diameter of ferrule 18 so that it fits over and can be welded to the ferrule 18, and a third ferrule 19 having an inner diameter approximately equal to the outer diameter of ferrule 19 so that is fits over and can be welded to the outside of ferrule 19.

The transparent ferrule may then be constructed using the following steps:

fusing a first thin wall ferrule to the optical fiber by directing a laser in a radial direction at an outside surface of the first thin wall ferrule such that the laser passes through the first thin wall ferrule and fuses a first portion of said first thin wall ferrule to the optical fiber; and fusing one or more additional thin wall ferrules to the first thin wall ferrule by directing the laser in a radial direction at an outside of the additional thin wall ferrule such that said laser passes through said additional thin wall ferrule and fuses a first portion of said additional thin wall ferrule to said first thin wall ferrule.

In each of the fusing steps, the laser is preferably moved circumferentially and axially with respect to respective thin wall ferrules so as to complete fuse the ferrules to each other and to the fiber core in the desired fusion area, which preferably has a length L as discussed above.

Any of the second and additional ferrules that are fused to the first ferrule may extend beyond the fusion area to define the extended portion 14 of the transparent ferrule 7 shown in FIG. 4, the extended portion 14 being spaced from the fiber core by gap 15 having a gap width defined by the thickness of the first or additional ferrules that do not have an extended length.

Figure 5:
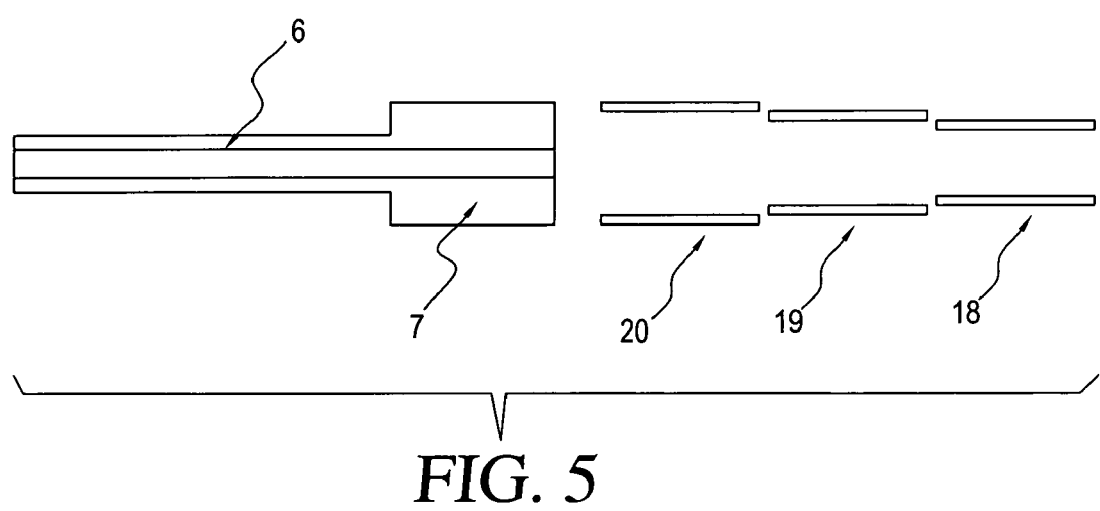
FIG. 5 is a side view illustrating a method of heat fusing the fiber core and ferrule that overcome restrictions on fusing laser penetration depth.

It will be appreciated that the number of thin wall ferrules may be less than or greater than three, depending on the desired overall width of the transparent ferrule and the penetration depth of the laser. In addition, one or more of the second and higher ferrules 19,20 may be longer than the ferrule 18 that is welded to the core 6 so as to form the ferrule extension 14 and gap 15. Those skilled in the art will appreciate that the thin wall ferrules may be welded directly to the core, as in FIG. 1, or to cladding 21 as illustrated in FIG. 5.

A variation of the optical fiber coupling arrangement of FIG. 4 is shown in FIG. 1. The coupling arrangement again includes a quartz ferrule 7' welded to fiber core 6' along a weld 8' having a desired length, the length of the weld determining how much energy couples to the core 6'. Ferrule 7' may be identical to the quartz ferrule of FIG. 4, although variations in the structure, materials, and/or dimensions of the ferrule are within the scope of the invention. The core 6' and ferrule 7' are situated in a connector 22 having a front recess or well 23 and a chamber 24 separated by ferrule mounting collar 25, which engages an outer diameter 26 of ferrule 7'. The rear of recess or well 23 is defined by a front of collar 25, which serves as or is coated with an absorber or reflector 22 to absorb or reflect stray radiation, indicated by arrows 26, that entirely misses the ferrule 7 and core 6.

Ferrule 7' may be flush with an end surface of connector 22 or may extend into a pre-focus area, as indicated by dashed line 27, and also into chamber 24. Dissipation of energy that reaches the rear of ferrule 7' may be enhanced by roughening side or end surfaces of ferrule 7' to scatter or absorb energy as it enters the rear chamber 24. In addition, reflection/absorption members or collars 28 and/or 29 having additional reflection and/or absorption surfaces may extend into chamber 24 to further dissipate errant radiation. It will be appreciated that the number of additional absorption/reflection members or collars is not limited to just two, but rather may be three or more even though just two collars are shown.

As indicated above, the connector 22 is secured to the ferrule by means of collar 25 having an inner mounting surface 26 secured to the ferrule by adhesive or mechanical means. In addition, the connector 22 may be secured to the buffer along line 30 by any conventional adhesive means, mechanical means such as crimping, or other securing means or methods. Preferably, the depth 32 of collar 25 and/or the length of mounting surface 26 is made as small as possible to minimize energy transfer from the ferrule 7' to the connector 2.

Figure 6:
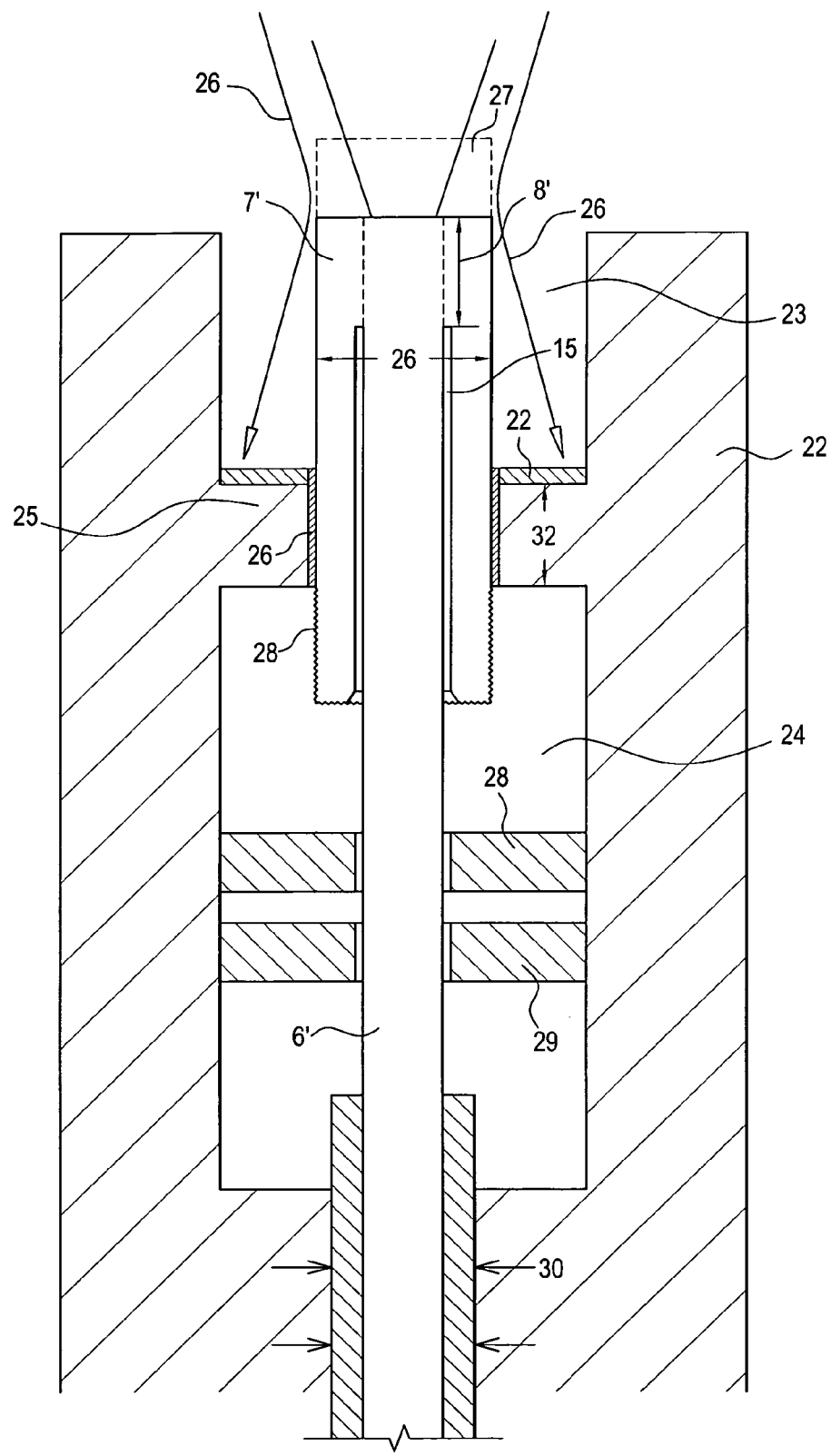
FIG. 6 is a side view of an alternative to the optical fiber coupling arrangement of FIG. 1.
Figure 7:
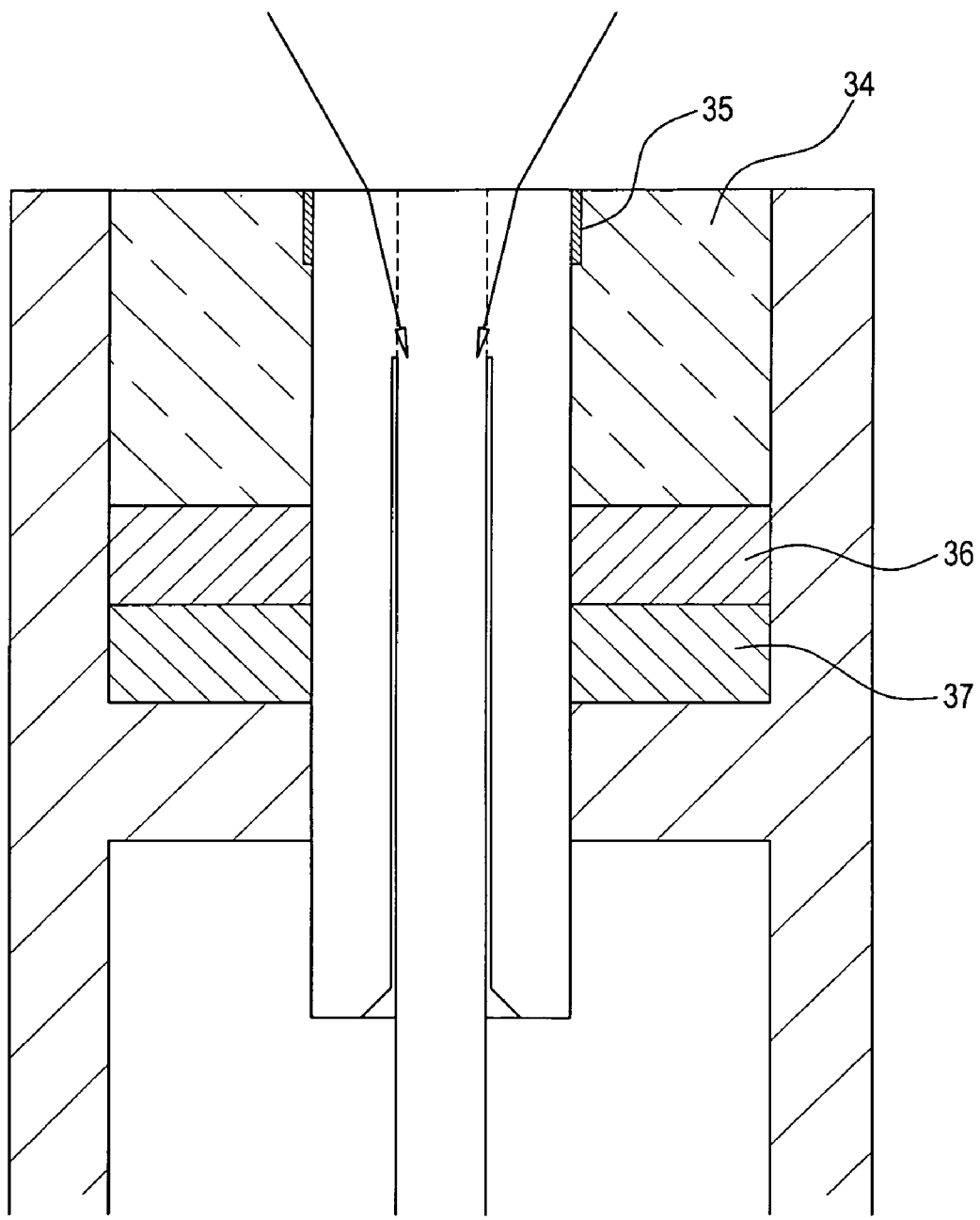
FIG. 7 is a side view of a second alternative to the optical fiber coupling arrangement of FIG. 1.

FIG. 7 shows yet another variation of the embodiment of FIG. 1, in which the well 23 of FIG. 6 is replaced by a second transparent ferrule 34 welded to the first transparent ferrule 7' along a second weld line 35. In addition, FIG. 7 shows the inclusion of additional energy absorption elements 35 and 36, though it will be appreciated that the second transparent ferrule may be used with or without the additional absorption elements. The remaining elements of the coupling or termination arrangement of FIG. 7, which are not numbered, may be similar or identical to those of the arrangements shown in either FIG. 1 or FIG. 6.

Having thus described preferred embodiments of the invention in sufficient detail to enable those skilled in the art to make and use the invention, it will nevertheless be appreciated that numerous variations and modifications of the illustrated embodiment may be made without departing from the spirit of the invention. For example, the termination arrangement of the invention may be used with or adapted for a variety of different types of optical fibers and laser delivery applications including not only medical applications, but also communications and other applications. It is therefore intended that the invention not be limited by the above description or accompanying drawings, but that it be defined solely in accordance with the appended claims.

I claim:

1. Apparatus for coupling focused radiant energy from a radiant energy source to an optical fiber comprising:
   a transparent ferrule fused to a coupling end of the optical fiber in a fusion area extending rearwardly a distance L from a coupling end of the fiber;
   said transparent ferrule including an extension that extends rearwardly from the fusion area with a gap between the fiber and the extension, whereby radiation incident on the coupling end of the fiber that fails to couple to the fiber will reflect off of an inner diameter of the extension in a direction away from the fiber,
   wherein said distance L is between:

$$L_{min} = y_1/\tan \phi_2, \text{and}$$

$$L_{max} = [y_1 + \text{core diameter}]/\tan \phi_2,$$

where $L_{min}$ and $L_{max}$ are respective minimum and maximum distances and $y_1 = $[spot size of the laser-core diameter]/2.

2. Apparatus as claimed in claim 1, wherein the transparent ferrule is fused to a core of the fiber.

3. Apparatus as claimed in claim 1, wherein said transparent ferrule comprises a plurality of thin wall ferrules fused together.

4. Apparatus as claimed in claim 1, further comprising a connector body surrounding said transparent ferrule, said connector body secured to said transparent ferrule by an adhesive.

5. Apparatus as claimed in claim 4, further comprising a crimp ferrule secured to a buffer of the optical fiber, but not secured to or in contact with said transparent ferrule.

6. Apparatus as claimed in claim 5, wherein said connector body is attached to said crimp ferrule by a second adhesive.

7. Apparatus as claimed in claim 6, wherein said connector body includes an opening through which said second adhesive is injected.

8. Apparatus as claimed in claim 1, further comprising a crimp ferrule secured to a buffer of the optical fiber, but not secured to or in contact with said transparent ferrule.

9. Apparatus as claimed in claim 1, further comprising a beam block surrounding said optical fiber and spaced from said transparent ferrule and said optical fiber.

10. Apparatus as claimed in claim 1, further comprising a body made of an energy absorptive material and spaced from said transparent ferrule and said optical fiber.

11. Apparatus as claimed in claim 1, further comprising an energy absorptive material surrounding said transparent ferrule.

12. Apparatus as claimed in claim 11, wherein said energy absorptive material is a second transparent ferrule welded to said transparent ferrule.

13. Apparatus as claimed in claim 1, further comprising a connector body having a recess at a front end and an inwardly extending collar for mounting said transparent ferrule in said connector body.

* * * * *